July 6, 1937.   F. J. KRAUSE   2,085,808
WELDING MACHINE
Filed Feb. 4, 1936   4 Sheets-Sheet 3
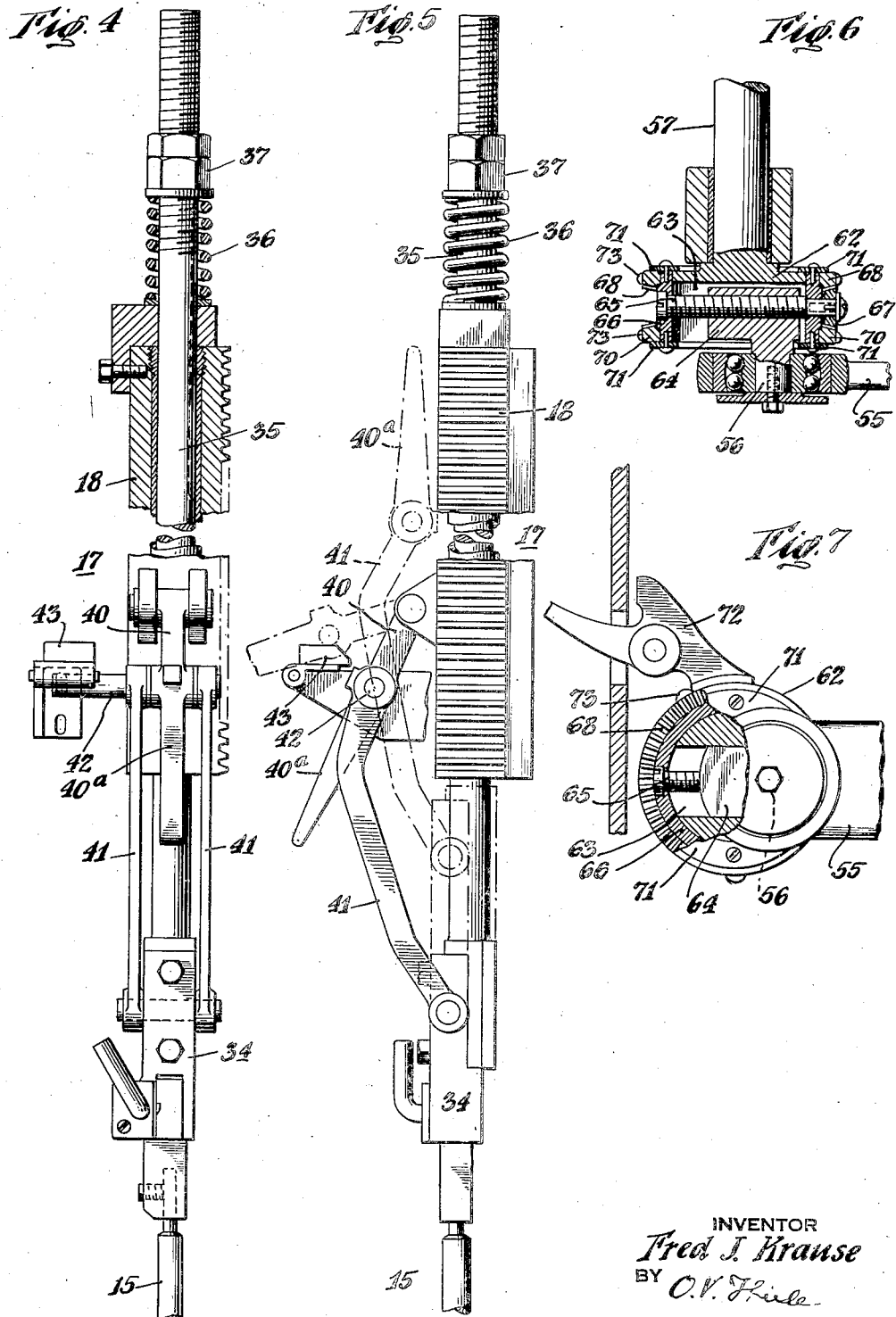

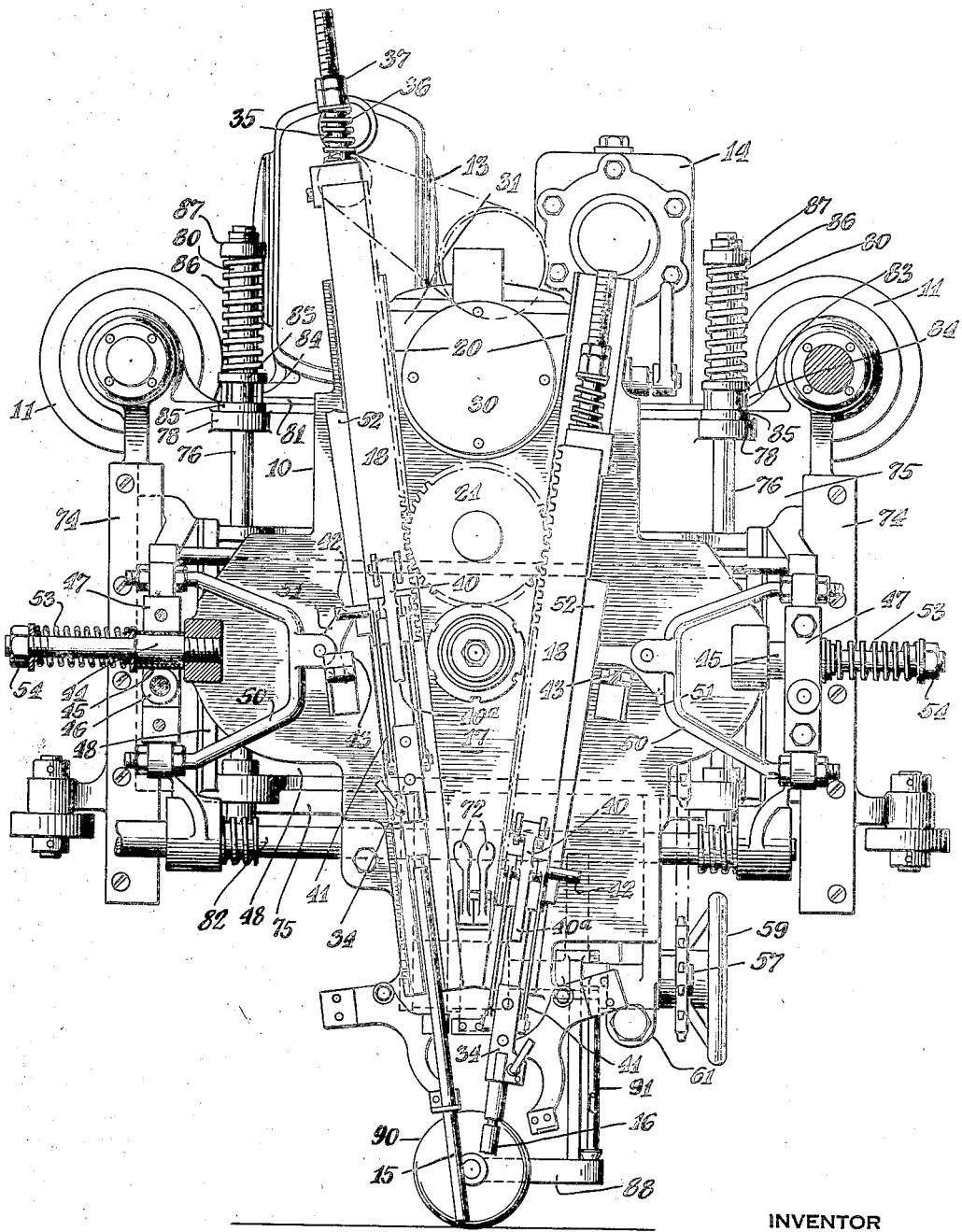

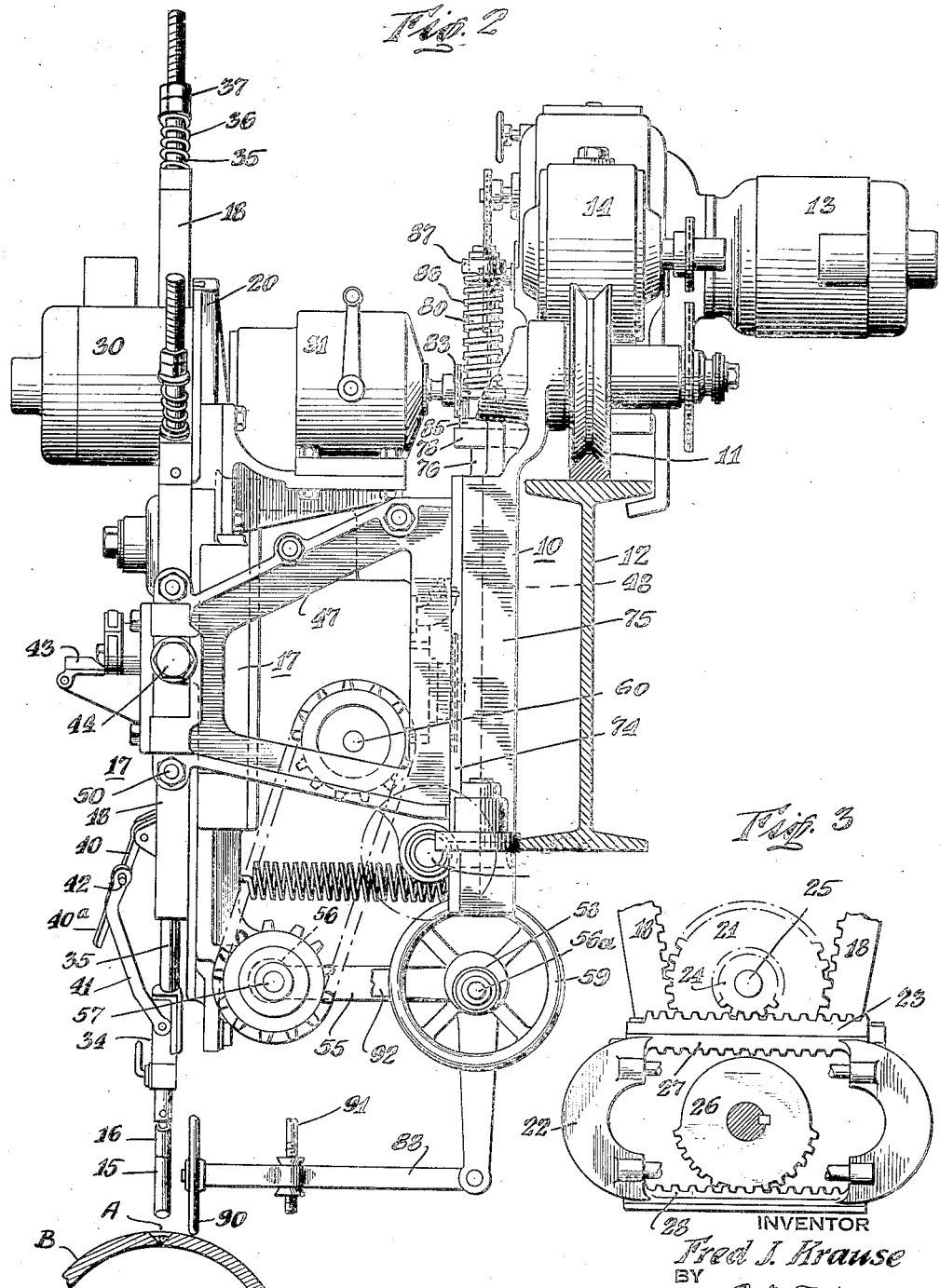

July 6, 1937.     F. J. KRAUSE     2,085,808
WELDING MACHINE
Filed Feb. 4, 1936     4 Sheets-Sheet 4
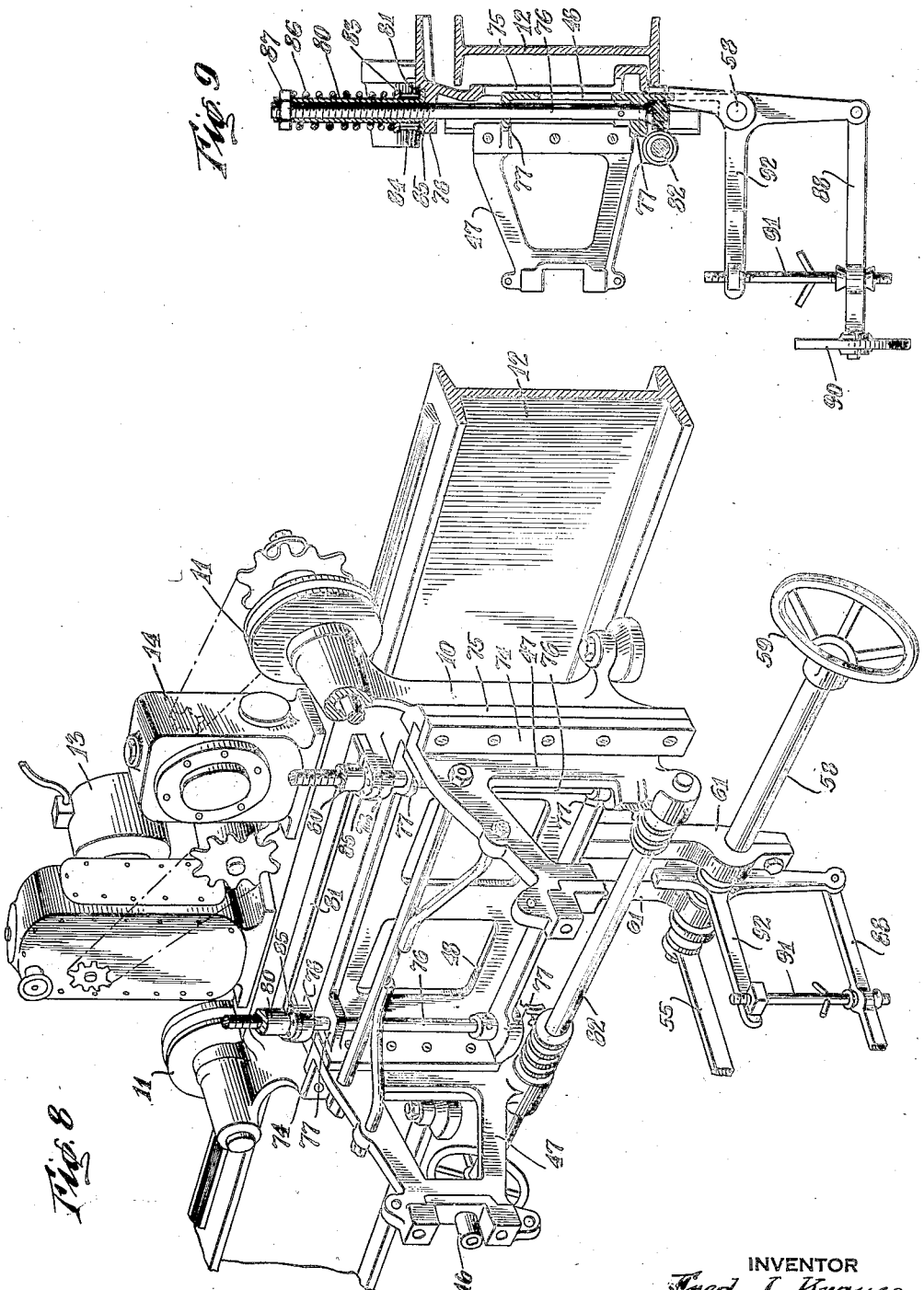
INVENTOR
*Fred J. Krause*
BY
*O. V. Him*
ATTORNEY Patented July 6, 1937

2,085,808

UNITED STATES PATENT OFFICE 2,085,808

WELDING MACHINE

Fred J. Krause, Chattanooga, Tenn., assignor to The Hedges-Walsh-Weidner Company, Chattanooga, Tenn.

Application February 4, 1936, Serial No. 62,241

15 Claims. (Cl. 219—8)

This invention relates to arc welding and particularly to improvements in welding machines. A feature of the present invention is that welding may be carried on continuously without interruption for renewal of electrodes due to the provision of means for operating a pair of electrodes so as to feed them to the welding point in alternation. A second feature is that the occurrence of gaps or laps in the weld is avoided. A third feature resides in automatically oscillating an electrode transversely of the weld as it is advanced therealong.

Other features and advantages of the invention will become apparent upon consideration of the following detailed description of an illustrative embodiment of the invention and the appended claims when read in conjunction with the accompanying drawings in which:

Figure 1 is a front elevation of welding apparatus embodying the invention;

Figure 2 is a side elevation corresponding to Figure 1;

Figure 3 illustrates a detail of the electrode operating mechanism;

Figures 4 and 5 are partly sectioned front and side elevational views, respectively, showing the electrode holders on an enlarged scale;

Figure 6 is a partly sectioned plan view of part of the oscillating mechanism for the welding head;

Figure 7 is an end view partly broken away, corresponding to Figure 6;

Figure 8 is a perspective view illustrating the construction of the travelling carriage that supports the welding head;

Figure 9 is a side elevational view, partly sectioned and on an enlarged scale, of part of the mechanism shown in Figure 8.

Referring first to Figures 1 and 2, the welding machine comprises a carriage 10 provided with traction wheels 11 guided on a girder 12 and driven by a motor 13 through a suitable speed regulating device 14 to advance a pair of electrodes 15, 16 mounted in a welding head 17 along the welding line A of the work B. The electrodes are supported in racks 18 slidably mounted in guides 20 on the welding head 17, the guides being convergent at their lower ends so that the centre lines of the electrodes at their work ends are spaced about one-half inch, for example, along the welding line. A gear 21 engages the teeth of both racks 18 to continuously operate them in unison but in opposite directions so as to feed one electrode to the weld while retracting the unconsumed portion of the other. Gear 21 is rotated first in one direction and then the other to feed and retract the electrodes in alternation.

Any suitable automatic reversing mechanism may be employed for alternating the direction of rotation of gear 21, such as the well-known form illustrated in Fig. 3 comprising a slide 22 having a rack 23 engaging a pinion 24 on the shaft 25 of gear 21 and driven by a uni-directional sector gear 26 located between and alternately engaging opposed racks 27, 28 on the slide. Gear 26 is driven by a motor 30 through a variable speed regulating device 31 and reduction gearing.

As illustrated in Figs. 4 and 5, the electrodes are slidably mounted in their supporting racks 18 for movement relatively thereto toward and away from the work. Each electrode is mounted in a holder 34 having a shank 35 to which the required electrical connections may be made. The shank 35 extends through a bore in the rack 18 and a spring 36 is mounted between the rack and nuts 37 which may be adjusted on the shank to regulate the position of the active end of the electrode with respect to the work. Levers 40, 41 attached to rack 18 and holder 34, respectively, are connected in toggle fashion by a pin 42. When the handle portion 40a of lever 40 is depressed the electrode is moved downwardly relatively to its supporting rack 18 into contact with the work to make electrical contact therewith. When handle 40a is released spring 36, having been compressed retracts the electrode and establishes the arc.

During withdrawal of the unconsumed portion of an electrode its holder 34 may be raised with respect to the upwardly moving rack 18 for providing an additional clearance of several inches above the work to facilitate replacement of the electrode. On raising the lever handle 40a to vertical position the holder is held in raised position due to the locking action of the toggle levers 40, 41. When a fresh electrode has been inserted and the holder 34 has been raised so that pin 42 is above a cam 43 mounted on a bracket projecting from the welding head 17, the handle 40a may be lowered until pin 42 strikes the cam. Cam 43 acts to maintain the new electrode raised out of contact with the work and is shaped so that as rack 18 continues its upward retracting movement and pin 42 rides on the cam levers 40, 41 return toward normal position. Cam 43 is positioned to permit pin 42 to ride off the cam at the time when upward movement of the rack ceases and its downward or feeding movement begins. Holder 34 then drops to its normal position with respect to its rack 18 thus moving the new electrode downwardly to automatically take the arc from the other as the direction of movement of the racks that support the electrodes is reversed.

As mentioned above, the centre lines of the active ends of electrodes 15, 16 are spaced along the welding line. Hence, unless special provision were made the rear electrode 15 would start welding at a point rearwardly of where the forward electrode 16 discontinued and conversely the latter would in turn continue from a point forwardly of where the rear electrode discontinued, thus producing laps or gaps in the weld. In order that this condition may be obviated, or controlled as desired, the welding head 17 is arranged to be automatically moved forwardly or backwardly with respect to the moving carriage 10 when either electrode takes up the weld from the other. As shown in Fig. 1, the welding head 17 is provided with trunnions 44 journalled in exteriorly squared collars 45 slidably mounted on antifriction rollers 46 on brackets 47 extending from the plate 48 of carriage 10. Adjustably attached to the brackets 47 are members 50 providing supports for latches 51. One end face of each latch is engageable with a cam 52 on the outer side of one of the electrode racks 18 and its other end face is engageable with the related member 50 so that, on downward movement of the related rack to feed its electrode, the welding head 17 is gradually moved in one direction or the other with respect to the carriage, the extent of movement in each direction depending upon the slope of cams 52 and the adjustments of member 50. These movements result in compressing one of a pair of springs 53 mounted between nuts 54 and the brackets 47, the other being mounted on extensions of the trunnions 45. When the cam 52 of the active electrode rides off its latch 51, upon reversal of movement of the electrodes, the compressed spring 53 acts to quickly shift the welding head 17 on the carriage so that as the new electrode is brought into action it starts welding at the point at which the previously fed electrode discontinued, or at a determined point with respect thereto. Thus, the occurrence of laps or gaps in the weld may be avoided, or controlled as desired.

A link 55 (Figs. 2 and 6 to 8) is connected by ball and socket joints at its ends to eccentric studs 56, 56a on shafts 57 and 58 mounted on carriage 10 and the welding head 17, respectively. By turning shaft 58 through a hand wheel 59 thereon the welding head may be pivoted about its trunnions on brackets 47 to swing the electrodes 15, 16 in either direction across the welding line for adjusting them transversely thereof. Automatic oscillation of the electrodes transversely of the welding line during their movement longitudinally thereof may be effected by driving the shaft 57 through a sprocket and chain drive from the shaft 60 of reduction gearing associated with the electrode operating mechanism and driven by motor 30. Shaft 57 is mounted in clamp bearings 61 (Fig. 8) and normally held against rotation so that eccentric stud 56 (Figs. 6 and 7) may oscillate the welding head by acting through link 55 against the carriage 10. The amplitude of oscillation of the electrodes depends upon the eccentricity of stud 56 which may be regulated by providing any suitable type of variable throw crank.

As illustrated in Figs. 6 and 7, the shaft 57 is provided with an enlarged head 62 formed with a slot 63 guiding a block 64 that carries the eccentric stud 56. Block 64 is threadedly mounted on a screw 65 journalled at its ends in an annulus 66 attached to head 62. A planetary pinion 67 keyed to an extension of screw 65 meshes with bevel ring gears 68 and 70 rotatably mounted on annulus 66 and held in place by plates 71. Normally the entire assembly rotates with shaft 57 and the amplitude of oscillation of the electrodes corresponds with the existing eccentric adjustment of stud 56. By selectively engaging one of a pair of levers 72, Figs. 1 and 7, with nubs 73 on the ring gears 68, 70 either may be held against rotation thus driving pinion 67 to shift block 64 for varying the eccentricity of stud 56. With this arrangement the amplitude of oscillation of the welding head may be adjusted while the apparatus is in operation.

As shown in Figs. 8 and 9, the plate 48, carrying the brackets 47 that support the welding head 17, is mounted for vertical movement in guides 74 on the base plate or frame 75 of carriage 10. A pair of shafts 76 extend through lugs 77 on plate 48 and lugs 78 on frame 75. The shafts 76 are threadedly engaged in sleeves 80 that may rest on the lugs 78 and which are interconnected by a bar 81 to prevent their rotation with the shafts. By turning a hand wheel on a shaft 82 geared to shafts 76 the plate 48, and hence the welding head 17, may be raised or lowered to adjust the electrodes vertically with respect to the work.

Collars 83 mounted on the sleeves 80 are provided with pins 84 projecting through apertures in flanges 85 on the sleeves to engage the lugs 78 on carriage 10. Springs 86 are mounted between the collars 83 and nuts 87 on the sleeve 80. By screwing down the nuts 87 the sleeves 80 may be raised clear of the lugs 78 on carriage 10 so that shafts 76 are raised and the plate 48 and welding head 17 are resiliently supported on the carriage. A pivoted arm 88 connected to plate 48 carries a roller 90 riding in contact with the work. Arm 88 may be adjusted to vary the position of roller 90 by means of a rod 91 connected thereto and threaded in a fixed arm 92 extending from plate 48. On encountering vertical irregularities or warped portions in the work, roller 90 acts to raise or lower plate 48 which carries the welding head and electrodes.

It should be noted that the automatic feeding and retraction of the electrodes in alternation cause a fresh electrode to be advanced to take the arc from the other, when it has been consumed and starts to retract, so that the welding operation may be carried on without interruptions to replace electrodes.

The mounting of an electrode for movement in its supporting rack permits the electrode to be pushed down into contact with the work by manipulating lever handle 40a and upon release of the latter the electrode springs back automatically in just the right manner to strike an arc. This arrangement also obviates waiting until the rack and holder have receded far enough to provide clearance for inserting the new electrode. This is particularly advantageous because, otherwise, before such recession of the rack takes place there is not enough room to insert a new electrode and when it does take place the time remaining before reversal of the rack might be too short unless the operator acted promptly.

The resilient mounting of the electrode holder to its rack also precludes jamming of the electrode against the work if it contacts the latter during welding since the electrode is yieldingly supported and may move upwardly several inches.

The movements of an electrode relatively to its feeding rack that may be effected through lever 40a further afford a ready means for nursing the arc by hand to overcome any disturbance and to re-establish normal welding conditions.

Cam 43 acting to hold the new electrode in raised position until reversal of the rack and then automatically dropping it to working position at the right time relieves the operator of waiting for the electrodes to reverse and of the delicate operation of then attempting dropping the electrode to working position at the exact instant when the other electrode starts to retract and the new one begins to feed.

The automatic displacement of the welding head and electrodes relatively to the carriage through cams 52 and springs 53, by compensating for the necessary spacing of the ends of the electrodes to prevent interference, avoids the occurrence of gaps or laps in the weld.

It should also be noted that a proper gap between the end of the active electrode and the work is maintained despite irregularities in the latter because of the automatic vertical adjustment of the welding head on the carriage under the control of the contact roller 90 on lever 88.

Although a specific embodiment of the invention has been shown in the drawings and described in detail herein, it is to be understood that many changes and variations might be made without departing from the invention and, therefore, it is desired and intended to include all such changes and variations within the scope of the appended claims.

What I claim is:

1. Welding apparatus comprising; a welding head; a pair of holders for consumable electrodes; individual supports for said holders mounted on said head for movement toward and away from the welding point, said holders being displaceably mounted on said supports; means for continuously moving said supports on said head alternately toward and away from the work to feed one electrode to the weld and to simultaneously retract the unconsumed portion of the other; and means for displacing the holder for said other, inactive, electrode in a direction away from the work to permit replacement of its electrode during said retracting movement of its support.

2. Welding apparatus comprising; a welding head; a pair of holders for consumable electrodes; individual supports for said holders mounted on said head for movement toward and away from the welding point, said holders being displaceably mounted on said supports; means for continuously moving said supports on said head in unison to alternately feed one electrode to the weld and simultaneously retract the other; means for displacing the holder for said other electrode with respect to its support for moving it further away from the weld to permit replacement of said electrode; and means controlling said other holder to hold the new electrode raised out of welding relation during the feeding movement of the support and holder for said one electrode.

3. Welding apparatus comprising; a welding head; a pair of holders for consumable electrodes; individual supports for said holders mounted on said head for movement toward and away from the welding point, said holders being displaceably mounted on said supports; means for moving said supports on said head in unison to alternately feed one electrode to the weld and simultaneously retract the other; means for displacing the holder for said other electrode with respect to its support in a direction away from the weld to permit replacement of said electrode; and means operative to displace said other holder in the opposite direction on its support for positioning the new electrode in welding relation to the work substantially upon reversal of the movement of said holder supports.

4. Arc welding apparatus comprising; a welding head; a pair of holders for consumable electrodes; individual supports for said holders mounted on said head for movement toward and away from the welding point, said holders being displaceably mounted on said supports; means for continuously moving said supports on said head alternately toward and away from the work to feed one electrode to the weld and to simultaneously retract the unconsumed portion of the other; means for displacing the holder for said other electrode with respect to its support for moving it further away from the work to permit replacement of said electrode; and means co-operating with the holder for said other electrode to hold a new electrode therein raised out of welding position during the retracting movement of its holder and acting, upon reversal of movement thereof for feeding said electrode, to drop the new electrode into a position adjacent said one electrode to automatically take the arc from the latter as it is retracted.

5. Arc welding apparatus comprising; a welding head; a holder for a consumable electrode; a support for said holder mounted on said head for movement toward and away from the welding point, said holder being displaceably mounted on said support; a lever connected to said holder and operable to advance the latter in its support for engaging its electrode with the work; and means operative on release of said lever for moving said holder and its electrode relatively to said support in a direction away from the work to strike the welding arc.

6. Welding apparatus comprising; a welding head; a pair of holders for consumable electrodes; individual supports for said holders mounted on said head for movement toward and away from the welding point, said holders being displaceably mounted on said supports; means for moving said supports on said head alternately toward and away from the work to feed one electrode to the weld and to simultaneously retract the unconsumed portion of the other; a lever connected to said holder for said other electrode and acting upon operation thereof to displace said holder relatively to its support and in a direction away from the work; and means cooperating with said lever to hold an electrode in said holder raised out of welding relation with the work.

7. Welding apparatus comprising; a welding head; a pair of holders for consumable electrodes; individual support for said holders mounted on said head for movement toward and away from the welding point, said holders being displaceably mounted on said supports; means for moving said supports on said head alternately toward and away from the work to feed one electrode to the weld and to simultaneously retract the unconsumed portion of the other; a lever connected to said holder for said other electrode and operable to displace said holder relatively to its support and in a direction away from the work; and cam means on said head cooperating with said lever to maintain an electrode in said holder out of contact with the work during retracting movement of the support for said holder and acting to permit movement of said holder in said support toward the work, during retraction thereof, to position its electrode in welding relation to the work upon reversal of the movement of said support.

8. Welding apparatus comprising; a carriage movable along the welding line of the work; a welding head on said carriage; a pair of electrode holders movably mounted on said head and positioned so that the work ends of the related electrodes are spaced along the welding line; means for moving said holders to position the respective electrodes in welding relation to the work in alternation; and means for automatically displacing said electrode holders along the welding line to selectively position either of said electrodes for continuing welding from a determined point with respect to that at which the other electrode discontinued.

9. Welding apparatus comprising; a carriage movable along the welding line of the work; a welding head mounted on said carriage for displacement along the welding line with respect thereto; a pair of holders for consumable electrodes mounted on said head so that the work ends of the related electrodes are spaced from each other along the welding line; means for moving said holders on said head to position the respective electrodes in welding relation to the work in alternation; and means for displacing said head on said carriage to position either of said electrodes for continuing welding from a determined point with respect to that at which the other electrode discontinued.

10. Welding apparatus comprising: a carriage movable along the welding line of the work; a welding head mounted on said carriage and displaceable along the welding line with respect thereto; a pair of holders for consumable electrodes mounted on said head so that the work ends of the related electrodes are spaced from each other along the welding line; means for moving said holders on said head to position the respective electrodes in welding relation to the work in alternation; and means for displacing said head on said carriage and forwardly along the welding line to position the rearwardly disposed electrode at the point where the forwardly disposed electrode discontinued welding for avoiding lapping of the weld.

11. Welding apparatus comprising; a carriage movable along the welding line of the work; a welding head mounted on said carriage and displaceable along the welding line with respect thereto; a pair of holders for consumable electrodes mounted on said head so that the work ends of the related electrodes are spaced from each other along the welding line; means for moving said holders on said head to position the respective electrodes in welding relation to the work in alternation; and means for displacing said head on said carriage and rearwardly along the welding line to position the forwardly disposed electrode at the point where the rearwardly disposed electrode discontinued welding for avoiding a gap in the weld.

12. Welding apparatus comprising; a carriage movable along the welding line of the work; a welding head on said carriage; a pair of holders for consumable electrodes mounted on said head so that the work ends of the related electrodes are spaced from each other along the welding line; means for moving said holders on said head alternately toward and away from the work to feed one electrode to the weld and to simultaneously retract the other electrode; and means controlled by the holder for said one electrode for displacing the holder for said other electrode along the welding line to position it for continuing welding at a determined point with respect to that at which said one electrode discontinued.

13. Welding apparatus comprising; a carriage movable along the welding line of the work; a welding head mounted on said carriage and displaceable along the welding line with respect thereto; a pair of holders for consumable electrodes mounted on said head so that the work ends of the related electrodes are spaced from each other along the welding line; means for moving said holders on said head to position the respective electrodes in welding relation to the work in alternation; and cam controlled means associated with said holders and said carriage acting to determinedly displace said welding head along the welding line with respect to said carriage.

14. Welding apparatus comprising; a carriage movable along the welding line of the work; a welding head mounted on said carriage and displaceable along the welding line with respect thereto; a pair of holders for consumable electrodes mounted on said head so that the work ends of the related electrodes are spaced from each other along the welding line; means for moving said holders on said head to position the respective electrodes in welding relation to the work in alternation; means controlled by the movements of said holders for displacing said welding head on said carriage to position either of said electrodes at a determined point with respect to that at which the other discontinues; and means associated with said holders for controlling said displacing means to regulate said movements of said welding head.

15. Arc welding apparatus comprising; a welding head; a holder for a consumable electrode; a support for said holder mounted on said head for movement toward and away from the welding point, said holder being displaceably carried by said support; means for moving said support to feed said electrode to the work; a lever connected to said holder and operable to advance the latter in its support for engaging its electrode with the work; and spring means mounted between said support and said holder so as to have energy stored therein upon said movement of said lever and acting, upon release of said lever, to move said holder and its electrode relatively to said support in a direction away from the work for striking the welding arc.

FRED J. KRAUSE.